(12) United States Patent
Kow et al.

(10) Patent No.: US 10,997,088 B2
(45) Date of Patent: May 4, 2021

(54) SECRECY SYSTEM AND DECRYPTION METHOD OF ON-CHIP DATA STREAM OF NONVOLATILE FPGA

(71) Applicant: Gowin Semiconductor Corporation, Ltd, GuangZhou (CN)

(72) Inventors: San-Ta Kow, Guangdong (CN); Jinghui Zhu, San Jose, CA (US); Diwakar Chopperla, Fremont, CA (US)

(73) Assignee: GOWIN Semiconductor Corporation, Ltd., GuangZhou (CN)

(*) Notice: Subject to any disclaimer, the term of this patent is extended or adjusted under 35 U.S.C. 154(b) by 74 days.

(21) Appl. No.: 15/633,172

(22) Filed: Jun. 26, 2017

(65) Prior Publication Data

US 2018/0011803 A1    Jan. 11, 2018

(30) Foreign Application Priority Data

Jul. 7, 2016    (CN) .......................... 201610534391.4

(51) Int. Cl.
*G06F 21/00*    (2013.01)
*G06F 12/14*    (2006.01)
*G06F 3/06*    (2006.01)

(52) U.S. Cl.
CPC .......... *G06F 12/1408* (2013.01); *G06F 3/062* (2013.01); *G06F 3/0619* (2013.01); *G06F 3/0623* (2013.01); *G06F 3/0652* (2013.01); *G06F 3/0679* (2013.01); *G06F 3/0688* (2013.01)

(58) Field of Classification Search
CPC .... G06F 12/1408; G06F 3/0619; G06F 3/062; G06F 3/0623; G06F 3/0652; G06F 3/0679; G06F 3/0688; G06F 3/0622; G06F 3/0637; G06F 21/76; G06F 21/79
See application file for complete search history.

(56) References Cited

U.S. PATENT DOCUMENTS 5,603,056 A * 2/1997 Totani ....................... G06F 8/65
                                                    710/8
5,845,313 A * 12/1998 Estakhri ................ G06F 3/0613
                                                    711/103
5,892,712 A * 4/1999 Hirose ............... G11C 14/0063
                                                    365/154
7,134,025 B1 * 11/2006 Trimberger ......... G06F 12/1425
                                                    713/189

(Continued)

*Primary Examiner* — John B King
(74) *Attorney, Agent, or Firm* — James M. Wu; JW Law Group

(57) ABSTRACT

A secrecy system and a decryption method of on-chip data stream of nonvolatile FPGA are provided in the present invention. The nonvolatile memory module of the system is configured to only allow the full erase operation. After the full erase operation is finished, the nonvolatile memory module gets into the initial state. Only the operation to the nonvolatile memory module under the initial state is effective, and thereby the encryption region unit is arranged in the nonvolatile memory module. Only the decryption data written into the encryption region unit under the initial state can make the nonvolatile memory module to be readable, so that the decryption of the system is finished, which greatly improves the secrecy precision.

8 Claims, 2 Drawing Sheets

(56) References Cited

U.S. PATENT DOCUMENTS

| | | | |
|---|---|---|---|
| 7,190,190 B1* | 3/2007 | Camarota | G11C 7/20 326/37 |
| 7,683,660 B1* | 3/2010 | Bakker | G06F 17/5054 326/38 |
| 9,367,701 B2* | 6/2016 | Merchan | G06F 21/62 |
| 2005/0014559 A1* | 1/2005 | Mattice | G06F 21/64 463/29 |
| 2005/0228980 A1* | 10/2005 | Brokish | G06F 21/575 713/2 |
| 2006/0059369 A1* | 3/2006 | Fayad | G06F 21/79 713/189 |
| 2006/0059373 A1* | 3/2006 | Fayad | G06F 21/72 713/192 |
| 2007/0086257 A1* | 4/2007 | Bernier | G06F 21/554 365/218 |
| 2007/0226512 A1* | 9/2007 | Kevenaar | H04L 9/3278 713/186 |
| 2008/0028187 A1* | 1/2008 | Casselman | G06F 13/409 712/37 |
| 2008/0313312 A1* | 12/2008 | Flynn | G06F 3/0613 709/221 |
| 2009/0279699 A1* | 11/2009 | Noda | H04L 9/3236 380/259 |
| 2010/0011261 A1* | 1/2010 | Cagno | G06F 11/1064 714/719 |
| 2010/0180065 A1* | 7/2010 | Cherian | G06F 12/0804 711/103 |
| 2011/0138192 A1* | 6/2011 | Kocher | G06F 21/575 713/189 |
| 2011/0215829 A1* | 9/2011 | Guajardo Merchan | H01L 23/544 326/8 |
| 2011/0302329 A1* | 12/2011 | Azam | H03K 19/1776 710/14 |
| 2013/0067137 A1* | 3/2013 | Molloy | G06F 1/3275 711/103 |
| 2013/0097455 A1* | 4/2013 | Chang | G06F 11/2005 714/3 |
| 2014/0317612 A1* | 10/2014 | Ayanam | G06F 11/1433 717/171 |
| 2015/0331611 A1* | 11/2015 | Hansen | G06F 3/06 711/103 |
| 2016/0077979 A1* | 3/2016 | Lesartre | G06F 12/1466 711/164 |
| 2016/0139811 A1* | 5/2016 | Ikeuchi | G06F 3/0629 711/170 |
| 2016/0202910 A1* | 7/2016 | Ravimohan | G06F 12/0246 711/103 |
| 2016/0274816 A1* | 9/2016 | Zhu | G06F 3/0632 |
| 2017/0026349 A1* | 1/2017 | Smith | H04L 63/0471 |
| 2017/0208047 A1* | 7/2017 | Rosenberg | G16H 50/70 |
| 2017/0213053 A1* | 7/2017 | Areno | G06F 21/76 |
| 2018/0107417 A1* | 4/2018 | Shechter | G06F 3/0656 |

* cited by examiner

SECRECY SYSTEM AND DECRYPTION METHOD OF ON-CHIP DATA STREAM OF NONVOLATILE FPGA

PRIORITY

This application claims the benefit of priority based on the Chinese Patent Application No. 201610534301.4, filed on Jul. 7, 2016, in the name of the same inventor and entitled "Secured Process and Decrypting Method for On-Chip Data Stream of Nonvolatile FPGA," the disclosure of which is incorporated herein by reference.

TECHNICAL FIELD

The present invention relates to the technical field of data protection of an integrated circuit, and specifically relates to a secrecy system and a decryption method of on-chip data stream of nonvolatile FPGA.

BACKGROUND

There are many classification methods of the integrated circuit, which may be classified as Memory, Microprocessor (CPU), Application Specific Integrated Circuits (ASICs) and programmable logic device. The programmable logic device may also be classified as SPLD, CPLD and FPGA. Nowadays the FPGA has become the mainstream. The programmable logic device is called FPGA hereinafter.

FPGA chip is a chip required control program after power is on. FPGA chip is not a fixed circuit, but a chip which can change its function with regard to requirements, and the function can be changed with the input data.

Based on character of storing programming data, FPGA is classified as volatile FPGA and nonvolatile FPGA. Volatile FPGA usually stores programming data stream using SRAM memory. When a device is powered up, it is typically programmed by an external CPU, or the programming data stream would be loaded automatically by an external nonvolatile memory. After power is off, all the loaded data would be disappeared. The nonvolatile FPGA has retained the programming data stream in the memory itself, so that the nonvolatile FPGA can get into a working state after power is on. After power is off, all the loaded data would be retained.

Because FPGA is a general device, different users may design their own intellectual property on FPGA, and apply to different technical fields. The intellectual property of the user is stored in the FPGA device in a form of data stream, so that FPGA generates a function that the user requires. If the data stream in the FPGA device is stolen by a lawbreaker, the same FPGA device may be bought, and the stolen data stream is used to program and download the FPGA device, so that user system is totally copied, and the intellectual property of the user may be produced and sold.

Programming and downloading of the data stream of the volatile FPGA are loaded from a plug-in nonvolatile device, or loaded from an external Central Processing Unit (CPU). Therefore, a hacker may obtain the intellectual property of the user by intercepting the downloaded data externally. The data stream of the nonvolatile FPGA is inside the device, which is more safety relative to the volatile FPGA. However, the hacker may obtain the intellectual property of the user by a special way.

The problem of data encryption of the nonvolatile memory has been long existed. Data in a memory could be originally read out. Data of this type of memory does not lose after power is off, giving opportunity for a lawbreaker to directly remove the device from a circuit board of a system. The device is put in the lawbreaker's own laboratory to research how to decrypt and then to read out the data.

In order to solve the contradiction between the memory being readable and the data requiring encryption, Karl M. Guttag and Steve Nussrallah of Texas Instruments Inc. (Texas Instruments Incorporated, Dallas, Tex.) have proposed a method of data encryption of nonvolatile memory as early as 1982, by adding a bit of data as Security Bit. When the memory is required to be read and written normally, the Security Bit is not set (such as "0"). When the memory is required to be encrypted, the Security Bit is set (such as "1"). Any read operations would be automatically prevented by the memory circuit, and then, the only method to convert the Security Bit back into "0" and normally read and write the memory is erasing all data together with the Security Bit. Therefore, the purpose of protecting data of user is reached.

So far, all the methods of encryption of data stream have one thing in common, that the memory is readable by default. When the data needs to be encrypted, the data becomes unreadable by setting one or more security bits, forming an encryption state. However, if the memory is erasable, only when the security bits and data are all erased, it is revert to a default state, so as to reach the purpose of secrecy.

With the development of decryption technology, the security bit of a device may be already found out by the exiting inverse design technology. If the security bit is found out and destroyed, the memory may become a readable state, and data therein can be read. Furthermore, if the security bit is set to be only one bit, or the positions of the security bits are relatively concentrated, only the security bits may be just erased by an exact positioning erasing, so the data is easily decrypted.

SUMMARY OF THE INVENTION

A high-safety secrecy system of on-chip data stream of nonvolatile FPGA is provided in present invention, not allowing any other operation except full erase under the condition without decryption data.

Another object of the present invention is to provide a decryption method of the secrecy system.

In order to achieve the above technical effect, the technical solution of the present invention is as follows:

A secrecy system of on-chip data stream of nonvolatile FPGA comprises a user-defined programmable logic module, a nonvolatile memory module, a programming control module, a programming I/O interface and a user I/O interface. The user-defined programmable logic module, the nonvolatile memory module and the programming I/O interface are all connected with the programming control module. The user I/O interface is connected with the user-defined programmable logic module. The nonvolatile memory module comprises an encryption region unit.

A Full erase operation is only allowed for the nonvolatile memory module under a default state, the nonvolatile memory module gets into an initial state after the full erase operation is finished, and the operation to the nonvolatile memory module is effective only under the initial state.

Further, only one connecting interface is between the nonvolatile memory module and the programming control module, and the programming control module is able to perform a read-write operation to the nonvolatile memory module only by the connecting interface.

Further, the user-defined programmable logic module comprises a SRAM array, programming data sent by the programming control module is stored in the SRAM array, and the whole user-defined programmable logic module is real-time controlled by the SRAM array.

Further, the user-defined programmable logic module comprises a logic interface, and the user data of the user data unit of the programming control module obtained from the nonvolatile memory module is received by the logic interface.

Further, the nonvolatile memory module comprises several programming logic data units, several user data units and the encryption region unit. The programming logic data units, the user data units and the encryption region unit are connected with the programming control module by the connecting interface of the nonvolatile memory module. The programming data is sent to the programming logic data units of the nonvolatile memory module by the programming I/O interface via the programming control module. The user data is sent to the programming control module from the user I/O interface via the logic interface of the user-defined programmable logic module, and then sent to the user data units of the nonvolatile memory module via the programming control module.

A decryption method of the secrecy system of on-chip data stream of nonvolatile FPGA comprises following steps:

S1: powering up the system, and performing a full erase operation to a nonvolatile memory module, so that the nonvolatile memory module gets into an initial state;

S2: decryption data is input by a user from a user I/O interface, and gets into a programming control module via a user-defined programmable logic module, and the decryption data input by the user is identified by the programming control module to judge its effectiveness;

S3: effective decryption data is sent to an encryption region unit of the nonvolatile memory module by the programming control module to perform decryption, so that the nonvolatile memory module is in a readable state and then the decryption operation is finished.

Wherein, after the system is decrypted, the user data in the nonvolatile memory module is initialized to a static memory module of the user by the programming control module.

Wherein, after decryption of the system is finished, the programming data in the nonvolatile memory module is loaded into a SRAM array of the user-defined programmable logic module by the programming control module.

Wherein, the decryption data can only be input when the nonvolatile memory module is under the initial state.

Wherein, the decryption data comprises dynamic data.

Compared with the existing technologies, the beneficial effects of the technical solution of the present invention include the following by way of example only.

The nonvolatile memory module in the present invention is configured to only allowed the full erase operation. After the full erase operation is finished, the nonvolatile memory module gets into the initial state. Only the operation to the nonvolatile memory module under the initial state is effective, and thereby the encryption region unit is arranged in the nonvolatile memory module. Only the decryption data written into the encryption region unit under the initial state can make the nonvolatile memory module to be readable, so that the decryption of the system is finished, which greatly improves the secrecy precision.

BRIEF DESCRIPTION OF THE DRAWINGS

The novel features of the present invention are set out with particularity in the appended claims, but the invention will be understood more fully and clearly from the following detailed description of the invention as set forth in the accompanying drawings in which:

DETAILED DESCRIPTION OF THE INVENTION

Accompanying drawings are exclusively for exemplary illustration, and shall not be understood as a limitation to the present invention.

In order to better illustrate the present embodiment, some components of the accompanying drawings would be eliminated, exaggerated or minimized, but shall not represent the size of a real product.

For those skilled in the art, it may be understood that some common structures of the accompanying drawings as well as their illustration may be eliminated.

The technical solution of the present invention will be further illustrated below, in combination with the accompanying drawings and embodiments.

Embodiment 1

Figure 1:
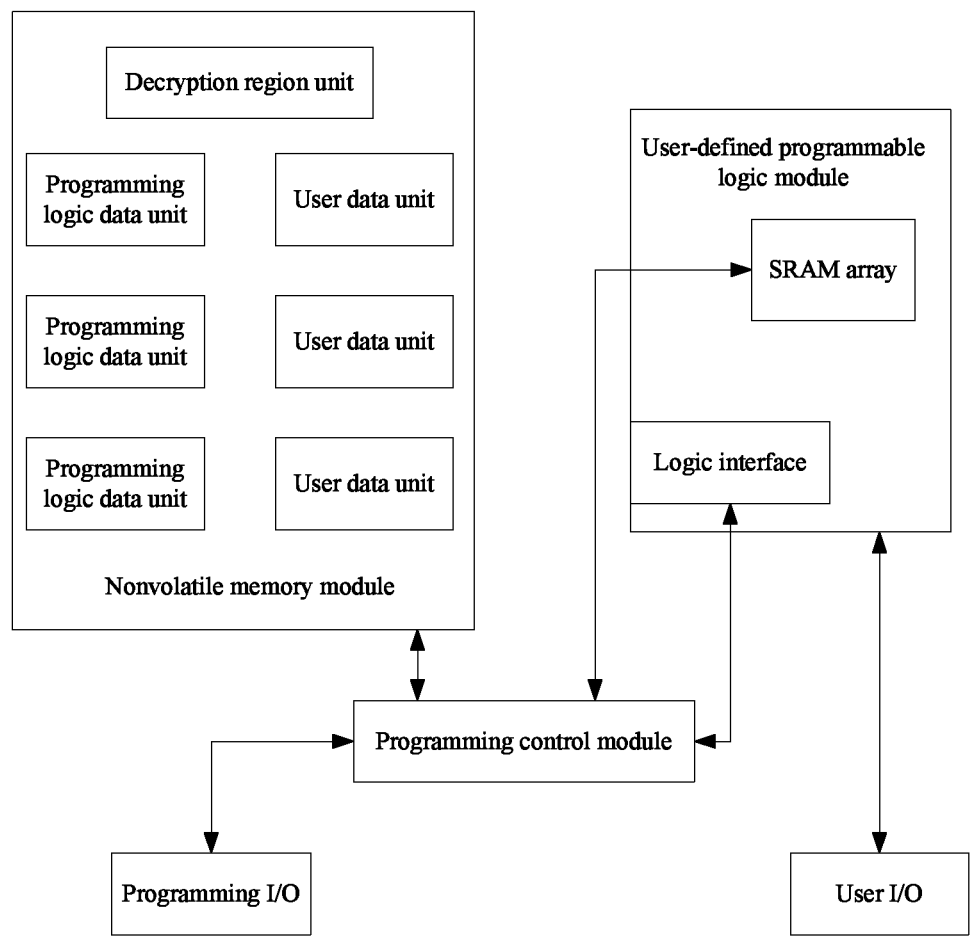
FIG. 1 is a structural view of the system according to the present invention.

As shown in FIG. 1, a secrecy system of on-chip data stream of nonvolatile FPGA comprises a user-defined programmable logic module, a nonvolatile memory module, a programming control module, a programming I/O interface and a user I/O interface. The user-defined programmable logic module, the nonvolatile memory module and the programming I/O interface are all connected with the programming control module. The user I/O interface is connected with the user-defined programmable logic module. The nonvolatile memory module comprises an encryption region unit.

A full erase operation is only allowed for the nonvolatile memory module under a default state. The nonvolatile memory module gets into an initial state after the full erase operation is finished, and the operation to the nonvolatile memory module is effective only under the initial state.

Only one connecting interface is between the nonvolatile memory module and the programming control module. The programming control module is able to perform a read-write operation to the nonvolatile memory module only by the connecting interface.

The user-defined programmable logic module comprises a SRAM array. Programming data sent by the programming control module is stored in the SRAM array, and the whole user-defined programmable logic module is real-time controlled by the SRAM array.

The user-defined programmable logic module comprises a logic interface. The user data of a user data unit of the programming control module obtained from the nonvolatile memory module is received by the logic interface.

The nonvolatile memory module comprises several programming logic data units, several user data units and the encryption region unit. The programming logic data units, the user data units and the encryption region unit are connected with the programming control module by the connecting interface of the nonvolatile memory module. The programming data is sent to the programming logic data units of the nonvolatile memory module by the programming I/O interface via the programming control module. The user data is sent to the programming control module from the user I/O interface via the logic interface of the user-defined programmable logic module, and then sent to the user data units of the nonvolatile memory module via the programming control module.

Embodiment 2

Figure 2:
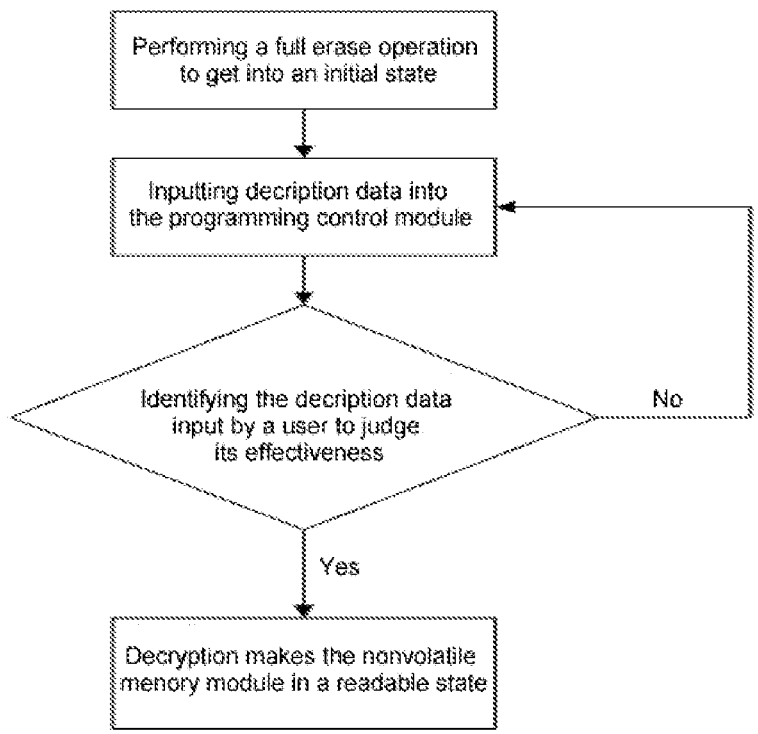
FIG. 2 is a flow chart of the method according to the present invention.

As shown in FIG. 2, a decryption method of the secrecy system of on-chip data stream of nonvolatile FPGA comprises the following steps:

S1: powering up the system, and performing a full erase operation to a nonvolatile memory module, so that the nonvolatile memory module gets into an initial state;

S2: decryption data is input by a user from a user I/O interface, and gets into a programming control module via a user-defined programmable logic module, and the decryption data input by the user is identified by the programming control module to judge its effectiveness;

S3: effective decryption data is sent to an encryption region unit of the nonvolatile memory module by the programming control module to perform decryption, so that the nonvolatile memory module is in a readable state and then the decryption operation is finished.

Wherein, after the system is decrypted, the user data in the nonvolatile memory module is initialized and sent to a static memory module of the user by the programming control module.

Wherein, after decryption of the system is finished, the programming data in the nonvolatile memory module is loaded into a SRAM array of the user-defined programmable logic module by the programming control module.

Wherein, the decryption data can only be input when the nonvolatile memory module is under the initial state; and the decryption data comprises dynamic data.

The nonvolatile memory module in the present invention is configured to only allow the full erase operation. After the full erase operation is finished, the nonvolatile memory module gets into the initial state. Only the operation to the nonvolatile memory module under the initial state is effective, and thereby the encryption region unit is arranged in the nonvolatile memory module. Only the decryption data written into the encryption region unit under the initial state can make the nonvolatile memory module to be readable, so that the decryption of the system is finished, which greatly improves the secrecy precision.

The same or similar reference signs correspond to the same or similar components.

The positional relationship in the accompanying drawings is exclusively for exemplary illustration, and shall not be understood as a limitation to the present invention.

The above embodiments of the present invention are given as examples exclusively used for clearly illustrating the present invention, but not a limitation to the implementations of the present invention. For those ordinarily skilled in the art, other different forms of change or variation can be made based on the above illustration. All implementations should not and could not be exhaustively listed herein. Any modification, equivalent substitution and improvement within the spirit and principle of the present invention, should be all included in the scope of protection of the claims of the present invention.

We claim:

1. A method for securing an on-chip data stream of non-volatile Field Programmable Gate Array (FPGA), comprising:

powering on a non-volatile FPGA containing a data stream for configuration stored in a non-volatile memory module;

determining that the FPGA is in a default state in a decryption region unit of the non-volatile memory module indicating that content of the non-volatile memory module is not secured and the content of the non-volatile memory is readable;

in response to determining that the FPGA is in the default state, performing a completely erasing operation to erase all previously stored data in the non-volatile memory module including the data stream; and resetting the non-volatile memory module to an initial state.

2. The method according to claim 1, further comprising sending user data stored in the non-volatile memory module to a Static Random Access Memory (SRAM) of a user-defined programmable logic module in the system when a programming control module identifies a set state in the decryption region unit indicating content the non-volatile memory module is encrypted while the non-volatile memory module is readable to the programming control module.

3. The method according to claim 1, further comprising loading programming data stored in the non-volatile memory module to the SRAM.

4. The method according to claim 1, wherein the decrypting data comprises dynamic data.

5. An encrypting and decrypting system of an on-chip data stream of non-volatile Field Programmable Gate Array (FPGA), comprising:

a non-volatile memory module containing at least one programming logic data unit for storing programming logic data and a decryption region unit for protecting stored programming logic data, wherein the decryption region unit stores a default state or a set state, wherein the default state indicates that content of the non-volatile memory module is not secured and the content of the non-volatile memory is readable, wherein the set state indicates that the content of the non-volatile memory module is secured; and a programming control module coupled to the non-volatile memory and configured to perform a completely erasing operation to erase all previously stored data in the non-volatile memory module in response to determining that the FPGA is in the default state after the system is powered on.

6. The system according to claim 5, further comprising a first interface between the non-volatile memory module and the programmable control module, and the programmable control module is able to perform a read-write operation to the non-volatile memory module only by the connecting interface.

7. The system according to claim 5, wherein the user-defined programmable logic module includes a Static Random Access Memory (SRAM), wherein the SRAM is configured to store user data and programming data loaded from the non-volatile memory module.

8. The system according to claim 5, further comprising a user-defined programmable logic module having a logic interface for receiving the user data obtained from the non-volatile memory module.

* * * * *